INVENTOR
Y. OKINAKA
ATTORNEY

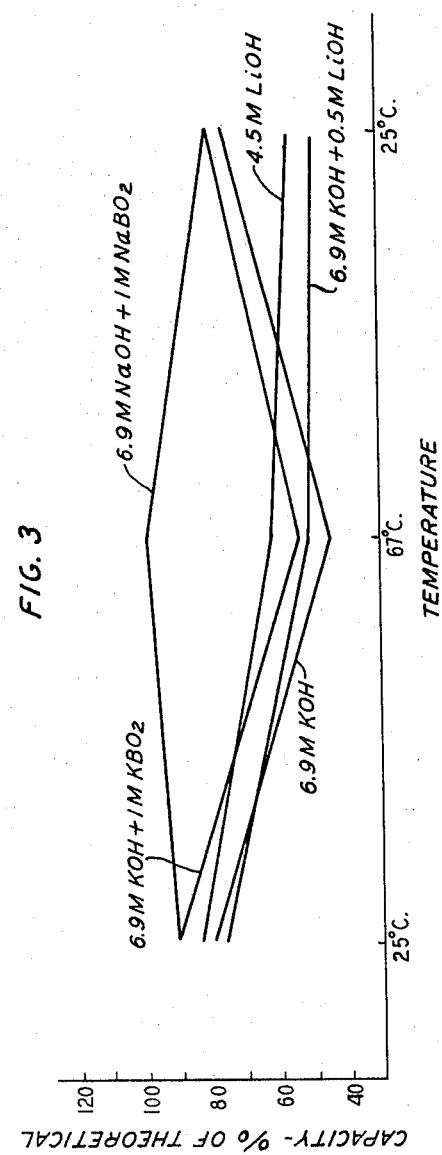

United States Patent Office 3,440,099
Patented Apr. 22, 1969

---

3,440,099
ELECTROLYTE ADDITIVES FOR NICKEL-CADMIUM CELLS
Yutaka Okinaka, Madison, N.J., assignor to Bell Telephone Laboratories, Incorporated, Murray Hill, N.J., a corporation of New York
Filed Nov. 15, 1966, Ser. No. 594,439
Int. Cl. H01m 43/04, 39/04
U.S. Cl. 136—6        7 Claims This invention relates to the improvement of the charging characteristics of nickel-cadmium cells by the addition of selected anions to the electrolyte.

The charging efficiency of nickel-cadmium cells at very low charge rates is notably inefficient. This defect in an otherwise high performance cell excludes the cell from consideration for some rather important uses. In particular, storage cells maintained at or near full charge by continuous or intermitent slow charging, are especially important to the telephone industry. New applications for storage batteries are now being considered in the telephone system. Many of these require the battery to serve remote equipment or customer equipment. The only method which appears practical for recharging these cells at remote locations is by charging from the central office, that is, placing the charging current directly on the telephone line. Obviously, for this scheme to be effective the charging current must be very small. One suggestion is to install storage cells in customers' sets to provide the ringing current and to power lighted dials. If the elimination of the ringing current is to be advantageous, the charging current for the storage cell must be considerably less than the ringing current.

For these proposals to be realized, current storage cells have to be significantly improved. One vital area of improvement for nickel-cadmium cells to which this invention is directed is the charging efficiency at low charge rates.

It has been known for some time that the addition of lithium to the standard KOH electrolyte in nickel-cadmium cells dramatically increases the charging efficiency of the cell at low charge currents. However, it has the adverse effect of altering the discharge behavior of the cell in such a way that a continuous voltage drop is experienced over essentially the entire discharge cycle. This is in contrast to the discharge behavior of the cell using pure KOH which delivers current at a relatively constant voltage over a considerable portion of its discharge cycle.

Certain additives to the electrolyte have now been found which markedly improve the charging efficiency at low charging rates and which do not impair the discharge characteristics of the cell. These additives are borates and phosphates.

These and other aspects of the invention will be appreciated from the following detailed description. In the drawing:

FIG. 3 is a plot showing cell capacity before and after a heating cycle for several electrolyte compositions.

Various electrolyte additives were evaluated by making Tafel plots at steady-state overcharge and at the 50 percent charged point ($\alpha=0.5$). Fresh nickel hydroxide electrodes usually exhibited a gradual change in potential-time characteristics and in charge capacity during the first few cycles. Therefore, each electrode was subjected to at least ten complete charge-discharge cycles including a 100 percent overcharge at approximately the two hour rate in the electrolyte under test before the data were taken. The measurement of steady-state overcharge potentials was carried out starting with the highest current (about 100 ma. per gram of active material) and decreasing the current by steps. It was noted that the establishment of steady potential was quite slow at low currents. The 50 percent charged points were taken also by lowering the current by steps after 50 percent of the charge capacity found on the preceding discharge cycle was returned to the electrode at a two hour rate. The charging efficiency at this high charging rate (approximately two hour rate) at room temperature can be assumed to be 100 percent. The potential at 50 percent charge points became steady in only a few minutes at all currents, so that the state-of-charge of the electrode essentially did not change during the run.

Figure 1:
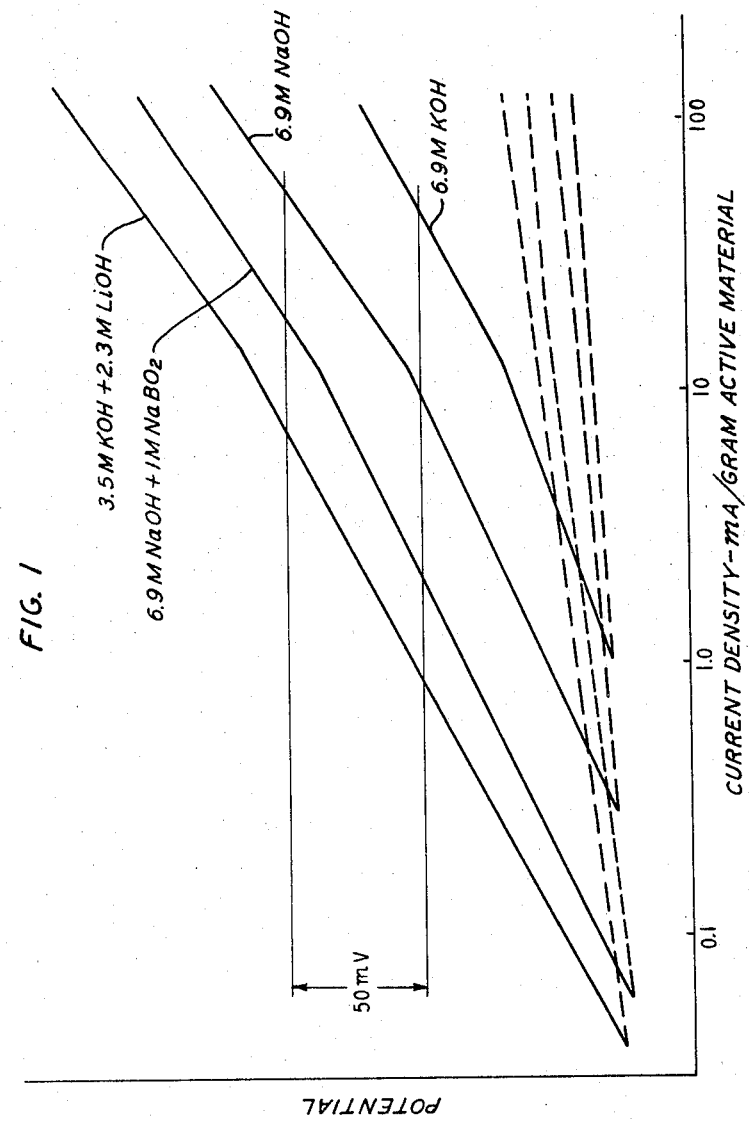
FIG. 1 is a plot of current density versus voltage, commonly known as Tafel curves, for several electrolytes.

Some examples of the Tafel plots are shown in FIG. 1. Note that each set of plots has been shifted arbitrarily along the potential axis for the sake of clarity. The charging current efficiency, $\theta$, was calculated from these plots with the aid of the following considerations.

It is known that the reason why the nickel hydroxide electrode cannot be charged at 100 percent current efficiency is that a part of the charging current is consumed in the oxygen evolution reaction. The situation can be most readily understood by considering the current-potential relationships for the oxygen evolution and for the charging reaction. Consider the Tafel line for the oxygen evolution (overcharge) reaction, solid lines in FIG. 1, and that which is obtained when a fraction $\alpha$ of the total amount of active material is converted into the charged compound, dashed lines in FIG. 1. Now, assume that (1) the charged and discharged materials are discrete in structure, (2) the oxygen evolution occurs only on the surface of the charged compound, and (3) the total surface area is constant and independent of the state-of-charge of the active material. These assumptions are made for the purpose of semi-quantitative illustration and the general survey of various additives. Under these assumptions, we can write at a constant potential $$i_{ox} = A j_{ox} \qquad (1)$$

$$i_t = \alpha A j_{ox} + (1-\alpha) A j_c \qquad (2)$$

where $i_{ox}$ is the current measured on overcharge in which case the only reaction occurring is the oxygen evolution. A the surface area of the active material, $j_{ox}$ the current density for the oxygen evolution reaction, $i_t$ the current measured on the material which has been charged by a fraction $\alpha$, and $j_c$ the current density for the charging reaction on the uncharged portion $(1-\alpha)$ of the active material. The charging current efficiency, $\theta$, is then given by $$\theta = \frac{i_c}{i_t} = \frac{(1-\alpha) A j_c}{\alpha A j_{ox} + (1-\alpha) A j_c} = 1 - \alpha \frac{i_{ox}}{i_t} (\times 100\%) \qquad (3)$$

Thus, the charging current efficiency at a given state of charge, $\alpha$, can be calculated from Tafel plots obtained on overcharge and at this particular state-of-charge. If the applied charging current is equal to the current value corresponding to the intersection of the two Tafel lines, then $i_t = i_{ox}$ and hence $\theta = (1-\alpha) \times 100\%$. On an exactly half-charged material, $\alpha = 0.5$ and therefore, this material is charged wtih a current efficiency of 50 percent if the current applied is equal to the value corresponding to the intersection. It is clear from this simplified consideration that an additive that causes a greater separation of the two Tafel lines should be more effective in increasing the charging current efficiency.

Figure 2:
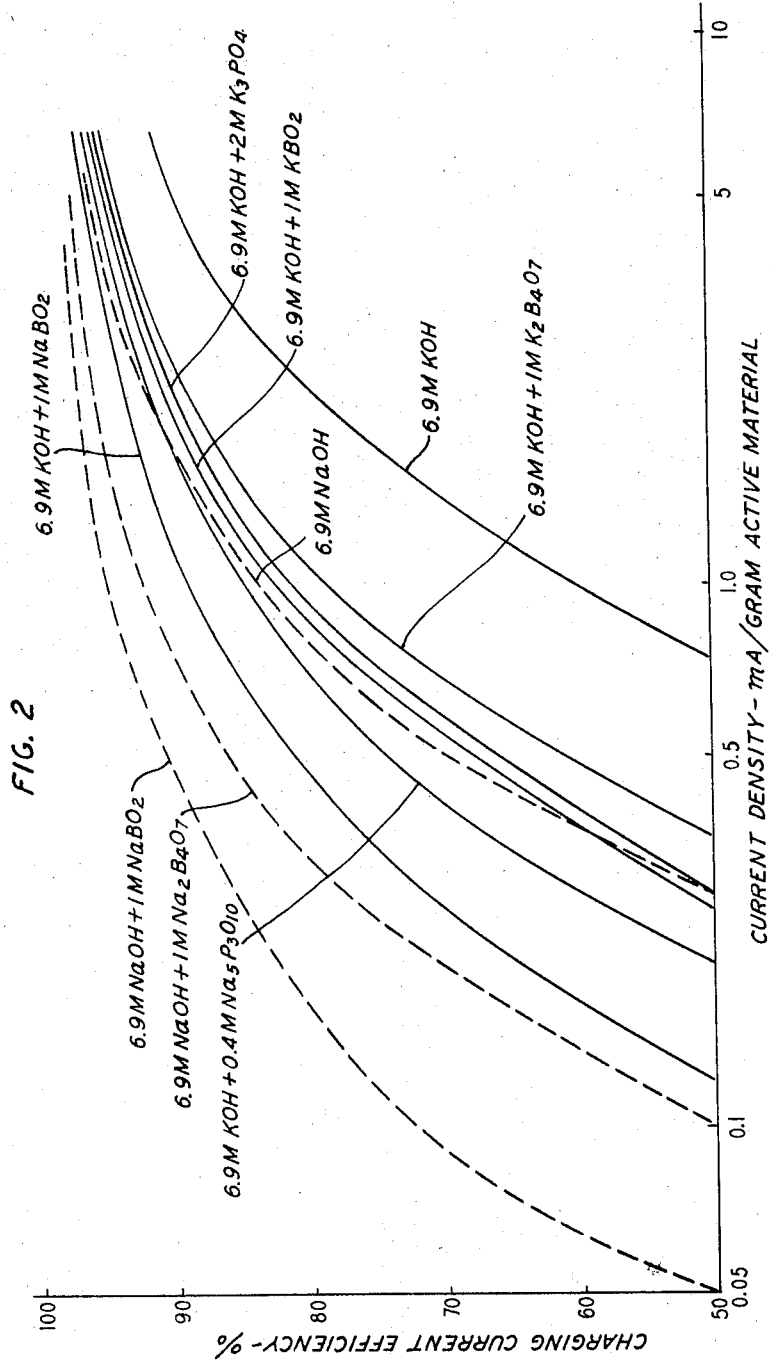
FIG. 2 is a plot of charging current efficiency versus charging current for cells containing several electrolytes some of which contain additives.

The calculated charging current efficiency $\theta$ for several electrolytes is shown in FIG. 2, plotted against the charging current density in ma./gram active material.

It is seen that in each case the electrolyte additive, phosphate or borate, improves the charging current efficiency of the cell. In this context the terms phosphates and borates are intended to include the various different phosphates and borate anions since the experimental evidence indicates that they all improve the charging current efficiency of the cell. Since the cation associated with the borate or phosphate was the same in each case as the base electrolyte it is clear that the anion is responsible for the effects observed. Consequently it is considered within the scope of this invention to add any soluble borate or phosphate that is compatible with the electrochemical system.

Studies similar to those described here of the effects of cations indicate that the sodium ion has distinct advantages. Consequently sodium borates and sodium phosphates are considered to be preferred additives. The base electrolyte may be either sodium hydroxide, potassium hydroxide or a mixture of both. Useful concentrations of hydroxide are 1 M to 12 M. Since potassium hydroxide is the conventional electrolyte for nickel-cadmium cells the use of potassium borates and potassium phosphates is also preferred.

As indicated earlier, lithium salts are to be avoided since they impair the discharge behavior of the cell. This effect was found to occur even in electrolytes containing low concentrations (0.5 M) of lithium ion. Lithium has an added disadvantage in that cells containing lithium lose a substantial portion of their capacity when heated to moderate temperatures. Cells containing the electrolytes of this invention show no such loss of capacity on heating. This effect is shown in FIG. 3, which charts the cell capacity of cells containing various electrolytes at 25° C., after heating to 67° C. and after cooling back to 25° C. The permanent loss of capacity in the lithium-containing cells is evident from the figure. In the other cells the room temperature capacity was restored after heating. It is also significant to note that the capacity of the cell containing sodium metaborate actually increases at the higher temperature.

The effect of concentration of the additive on the parameters mentioned above was investigated to determine an operative range of electrolyte compositions. Concentrations of 1 M and 1.5 M of sodium metaborate in 6.9 M sodium hydroxide gave essentially identical results. A 2 M solution is not practical at room temperature because of solubility limitations. The effect at 0.1 M was negligible while with 0.5 M sodium metaborate a significant improvement was obtained. Thus a practical range of 0.5 M to 1.5 M of the additive can be prescribed.

It has also been found that the additives of this invention are effective in reducing the self discharge that occurs in the cell on open-circuit. This effect was measured at 67° C. to provide an accelerated test. The charging efficiency at 67° C. was also measured. The results are given in the following table.

TABLE.—CHARGING EFFICIENCY AND SELF DISCHARGE IN VARIOUS ELECTROLYTES AT 67° C.

[In charging efficiency measurements, electrode was charged at C/10 rate to 75% of the full capacity measured at 67° C., and discharged immediately at C/10 rate]

| Electrolyte | Charging efficiency, percent | Amount of self discharge occurred in 8 days at 67° C., percent |
|---|---|---|
| 6.9M KOH | 39–44 | 23 |
| 6.9M KOH+1M KBO$_2$ | 56–63 | 18 |
| 6.9M NaOH | 49–51 | 10 |
| 6.9M NaOH+1M NaBO$_2$ | 71–76 | 5 |

Finally it should be mentioned that throughout these investigations no adverse effects were observed on the cadmium electrode as a result of the addition of borates or phosphates or on any other aspect of the cell performance.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A nickel-cadmium cell comprising a nickel-hydroxide positive electrode and a cadmium negative electrode both in contact with an aqueous electrolyte comprising a first constituent selected from the group consisting of sodium hydroxide, potassium hydroxide and mixtures thereof and an additive selected from the group consisting of sodium borate, potassium borate, sodium phosphate, potassium phosphate and mixtures thereof.

2. The cell of claim 1 in which the first constituent is potassium hydroxide.

3. The cell of claim 2 in which the additive is sodium borate in a concentration of 0.5 M to 1.5 M.

4. The cell of claim 1 in which the first constituent is a mixture of sodium hydroxide and potassium hydroxide.

5. The cell of claim 1 in which the electrolyte consists essentially of sodium hydroxide and sodium borate.

6. The cell of claim 1 in which the additive is sodium phosphate.

7. The cell of claim 1 in which the additive is potassium phosphate.

References Cited

UNITED STATES PATENTS

| 1,826,724 | 10/1931 | Booss et al. | 136—154 |
| 2,925,358 | 2/1960 | De Maio et al. | 136—154 |
| 2,996,563 | 8/1961 | Haebler | 136—27 |
| 3,183,124 | 5/1965 | Jasinski | 136—120 XR |

WINSTON A. DOUGLAS, *Primary Examiner.*

A. SKAPARS, *Assistant Examiner.*

U.S. Cl. X.R.

136—24, 28, 154